United States Patent
Shimizu

(10) Patent No.: US 9,435,949 B2
(45) Date of Patent: Sep. 6, 2016

(54) OPTICAL INTEGRATED CIRCUIT AND MANUFACTURING METHOD THEREOF

(71) Applicant: NEC Corporation, Minato-ku, Tokyo (JP)

(72) Inventor: Takanori Shimizu, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/661,638

(22) Filed: Mar. 18, 2015

(65) Prior Publication Data

US 2015/0277043 A1 Oct. 1, 2015

(30) Foreign Application Priority Data

Mar. 25, 2014 (JP) ................................. 2014-061577

(51) Int. Cl.
| | |
|---|---|
| *G02B 6/122* | (2006.01) |
| *G02B 6/12* | (2006.01) |
| *G02F 1/025* | (2006.01) |
| *G02F 1/225* | (2006.01) |
| *G02B 6/42* | (2006.01) |

(52) U.S. Cl.
CPC ......... *G02B 6/1228* (2013.01); *G02B 6/12004* (2013.01); *G02F 1/025* (2013.01); *G02F 1/2257* (2013.01); *G02B 6/42* (2013.01); *G02F 2202/105* (2013.01)

(58) Field of Classification Search
CPC ........ G02B 6/122; G02B 6/132; G02B 6/64; G02B 6/42
USPC ....................................................... 385/14, 16
See application file for complete search history.

(56) References Cited

U.S. PATENT DOCUMENTS

| | | | | |
|---|---|---|---|---|
| 6,112,002 | A | * | 8/2000 | Tabuchi ......................... 385/50 |
| 8,126,301 | B2 | * | 2/2012 | Ishizaka ......................... 385/31 |
| 2003/0036217 | A1 | * | 2/2003 | Richard et al. ................. 438/98 |
| 2010/0111468 | A1 | * | 5/2010 | Funabashi et al. ............. 385/14 |

FOREIGN PATENT DOCUMENTS

WO 2008111447 A1 9/2008

* cited by examiner

*Primary Examiner* — Kaveh C Kianni

(57) ABSTRACT

An optical integrated circuit formed on a substrate includes a light source, a spot size converter section configured to convert a spot size of light emitted from the light source, a waveguide section connected to the spot size converter section, and an active section connected to the waveguide section, layers sequentially a lower clad layer, core layer, shared layer, and upper clad layer on the substrate, makes a refractive index of the shared layer greater than refractive indices of the lower clad layer and upper clad layer and less than a refractive index of the core layer, and makes the spot size converter section, the waveguide section, and the active section share the shared layer. Accordingly, it is possible to provide an optoelectric integrated circuit by which both a simplification in a manufacturing process and a high efficiency in optical coupling between a light source and a waveguide are achieved.

13 Claims, 7 Drawing Sheets

OPTICAL INTEGRATED CIRCUIT AND MANUFACTURING METHOD THEREOF

This application is based upon and claims the benefit of priority from Japanese Patent Application No. 2014-061577, filed on Mar. 25, 2014, the disclosure of which is incorporated herein in its entirety by reference.

TECHNICAL FIELD

The present invention relates to a structure of an optical integrated circuit which is used in optical interconnections or optical communications and a manufacturing method thereof.

BACKGROUND ART

As a data amount a computer device or the like deals with increases, data transmission by electrical signals has been replaced with the one by optical signals. For example, some transceivers or other various devices and apparatuses transmit or receive data by optical signals. In recent years, fabrication of an optical integrated circuit, in which a transmission unit, a reception unit, and an optical wiring unit of these transceivers or devices and apparatuses are formed on a silicon substrate, has been tried by using a technology referred to as silicon photonics (for example, refer to Non-patent Literature (NPL) 1 "Y. Urino et al., Optics Express, Vol. 19, No. 26, pp. B159-B165, December, 2011").

On the other hand, as an integrated light source formed on a silicon substrate, a structure in which a semiconductor laser (Laser Diode, abbreviated to LD) array is mounted on a silicon wire waveguide platform by a flip chip mounting method is disclosed. In this method, in order to improve optical coupling between the waveguide and the LD, it is preferable to set the spot size of the waveguide identical to the spot size of the LD, and, in order to increase alignment tolerance, it is preferable to enlarge the spot size. As a structure to achieve these preferences, a structure in which a spot size converter is arranged on an end face of a waveguide connected to an LD is disclosed (for example, refer to Patent Literature (PTL) 1 "International Publication No. 2008/111447", and NPL 2 "T. Shimizu et al., IEEE 8th International Conference on Group IV photonics, pp. 181-183, September, 2011").

In NPL 1, after a waveguide section, a modulator section, and a photodetector section are formed, a light source is formed. For an optical integrated circuit, constraints on a manufacturing process become more critical as the process proceeds to later process steps. Therefore, due to constraints on the manufacturing process, a core of a spot size converter, which improves optical coupling with the light source, is formed in a waveguide section process step and a wide tapered structure formed by core layer only is used, causing an increase in coupling loss between an LD, which is a light source, and a waveguide.

On the other hand, in NPL 2, to improve optical coupling between an LD and a waveguide, a spot size converter having a core layer with a square cross-sectional shape is used. As a result, a layer which functions as a core layer for the spot size converter has a thick film thickness, and the core layer causes level differences. In particular, in forming a spot size converter, in order to prevent etching damage to the active sections such as a modulator and a photodetector, it is necessary to use a countermeasure such as forming a passivation layer or an etch stop layer on the active sections whose core layer is removed. Also, in forming electrical wiring sections in active sections such as a modulator and a photodetector after a spot size converter is formed, it is necessary to use a countermeasure to prevent breaking or shortening of the electrical wiring when the electrical wiring crosses upper layer of the core layer, which causes large level differences. In consequence, the manufacturing process has become complicated.

SUMMARY

The present invention is made in consideration of the above-described problems, and an exemplary object of the invention is to provide an optoelectric integrated circuit by which both a simplification in a manufacturing process and a high efficiency in optical coupling between a light source and a waveguide are achieved at the same time.

An optical integrated circuit according to the present invention, which is formed on a substrate, includes a light source, a spot size converter section configured to convert a spot size of light emitted from the light source, a waveguide section connected to the spot size converter section, and an active section connected to the waveguide section, wherein a lower clad layer, a core layer, a shared layer, and an upper clad layer are layered sequentially on the substrate, a refractive index of the shared layer is greater than refractive indices of the lower clad layer and the upper clad layer and less than a refractive index of the core layer, and the spot size converter section, the waveguide section, and the active section share the shared layer.

An optical integrated circuit according to the present invention, formed on a substrate, includes a light source, a spot size converter section configured to convert a spot size of light emitted from the light source, a waveguide section connected to the spot size converter section, and an active section connected to the waveguide section, and further includes a shared layer on the substrate, wherein the shared layer functions as a core for the spot size converter section, as an upper clad for the waveguide section, and as an interlayer insulating layer for the active section, respectively.

A manufacturing method of an optical integrated circuit according to the present invention, the optical integrated circuit including, on a substrate, a light source, a spot size converter section configured to convert a spot size of light emitted from the light source, a waveguide section connected to the spot size converter section, and an active section connected to the waveguide section, includes the steps of layering a lower clad layer, a core layer, a shared layer, and an upper clad layer sequentially on the substrate, making a refractive index of the shared layer greater than refractive indices of the lower clad layer and the upper clad layer and less than a refractive index of the core layer, and forming the shared layer in the spot size converter section, the waveguide section, and the active section.

According to the present invention, it is possible to provide an optoelectric integrated circuit by which both a simplification in a manufacturing process and a high efficiency in optical coupling between a light source and a waveguide are achieved at the same time.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will be described in detail below with reference to the accompanying drawings. Although technically preferred limitations are added to the exemplary embodiments, which will be described below, in order to carry out the present invention, the scope of the present invention is not limited thereto.

First Exemplary Embodiment

Figure 1:
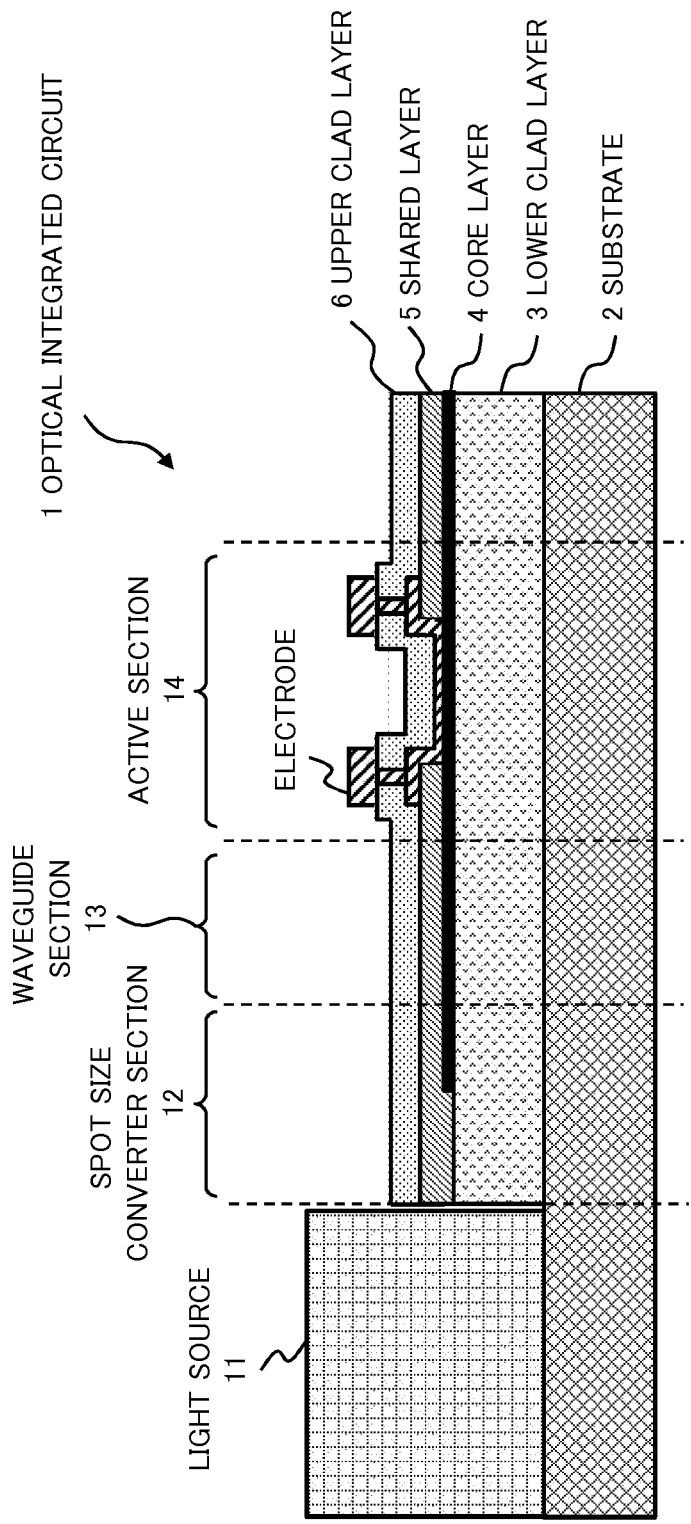
FIG. 1 is a cross-sectional view illustrating a structure of an optical integrated circuit of a first exemplary embodiment of the present invention.

FIG. 1 is a cross-sectional view illustrating a structure of an optical integrated circuit 1 of a first exemplary embodiment of the present invention. The optical integrated circuit 1, which is formed on a substrate, includes a light source 11, a spot size converter section 12 configured to convert a spot size of light emitted from the light source 11, a waveguide section 13 connected to the spot size converter section 12, and an active section 14 connected to the waveguide section 13. Further, on the substrate 2, a lower clad layer 3, a core layer 4, a shared layer 5, and an upper clad layer 6 are layered sequentially. Furthermore, a refractive index of the shared layer 5 is greater than refractive indices of the lower clad layer 3 and the upper clad layer 6 and less than a refractive index of the core layer 4. Moreover, the spot size converter section 12, the waveguide section 13, and the active section 14 share the shared layer 5.

According to the first exemplary embodiment, the shared layer 5 functions as a core layer for the spot size converter section 12, as an upper clad layer for the waveguide section 13, and as an interlayer insulating film for the active section 14. It is thus not necessary to remove the shared layer 5 in a manufacturing process of the active section 14. Therefore, according to the first exemplary embodiment, it is possible to provide an optoelectric integrated circuit by which both a simplification of the manufacturing process and an increase in efficiency of optical coupling between a light source and a waveguide are achieved at the same time.

Second Exemplary Embodiment

Figure 2A:
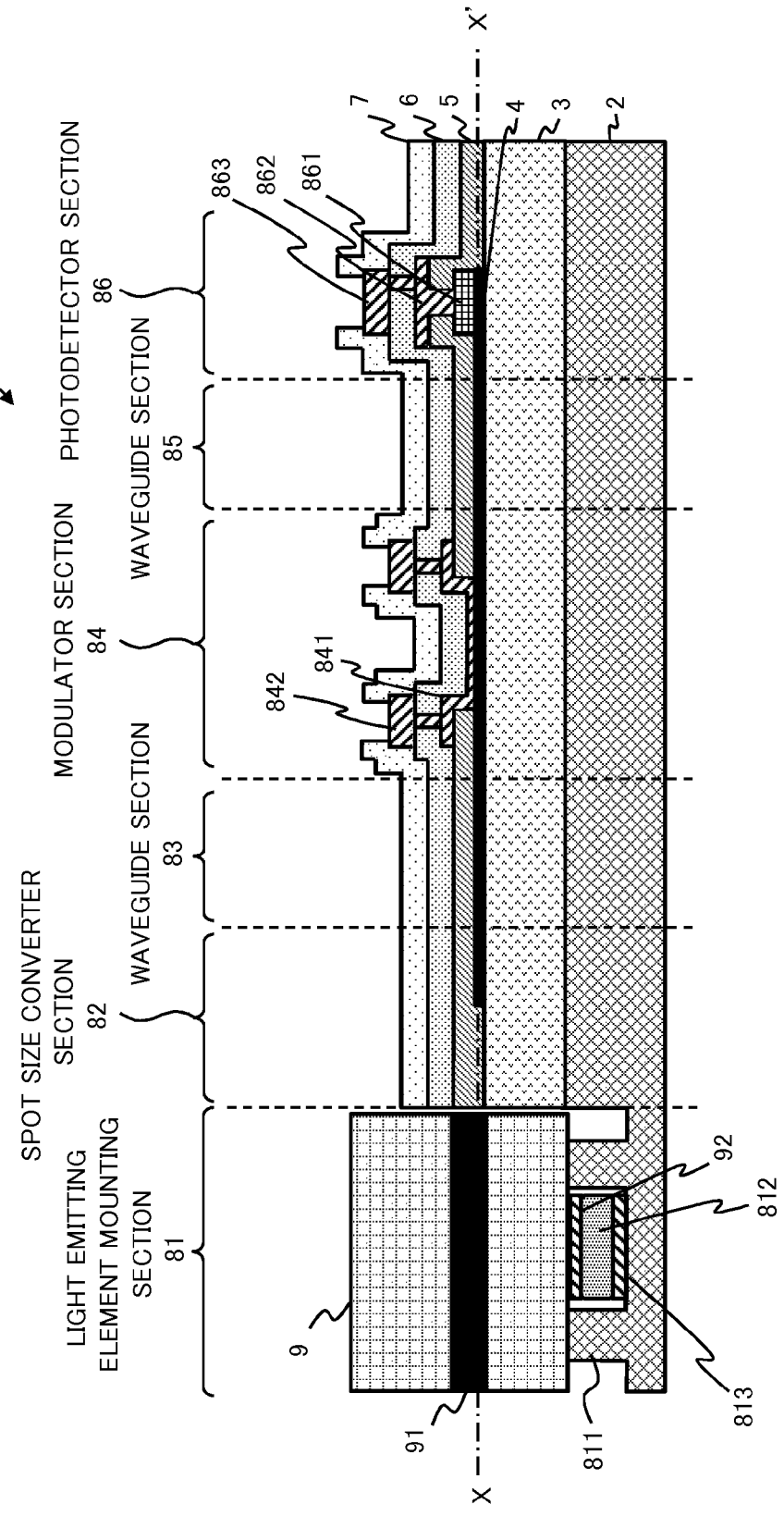
FIG. 2A is a cross-sectional view illustrating a structure of an optical integrated circuit of a second exemplary embodiment of the present invention.
Figure 2B:
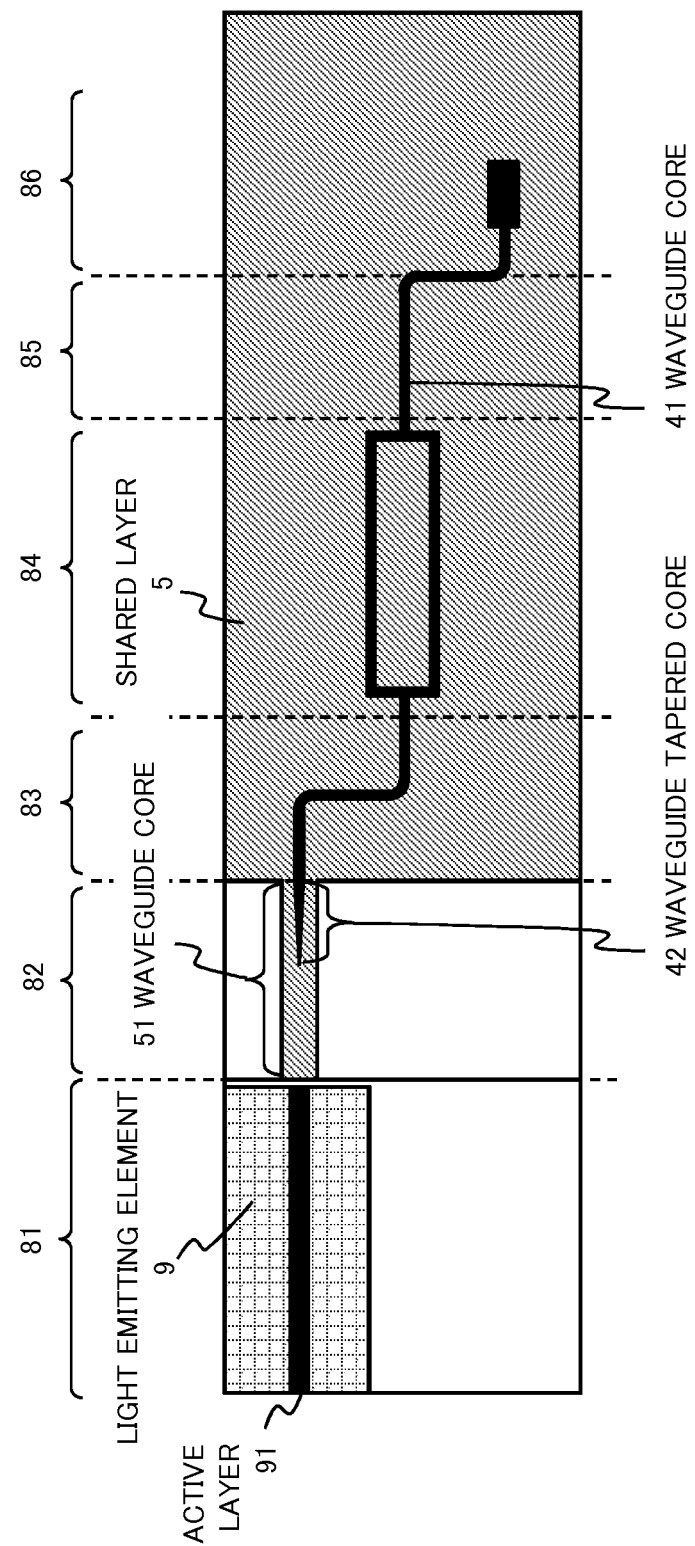
FIG. 2B is a plan view illustrating the structure along a cross section including the line X-X' of the optical integrated circuit of the second exemplary embodiment of the present invention.
Figure 2C:
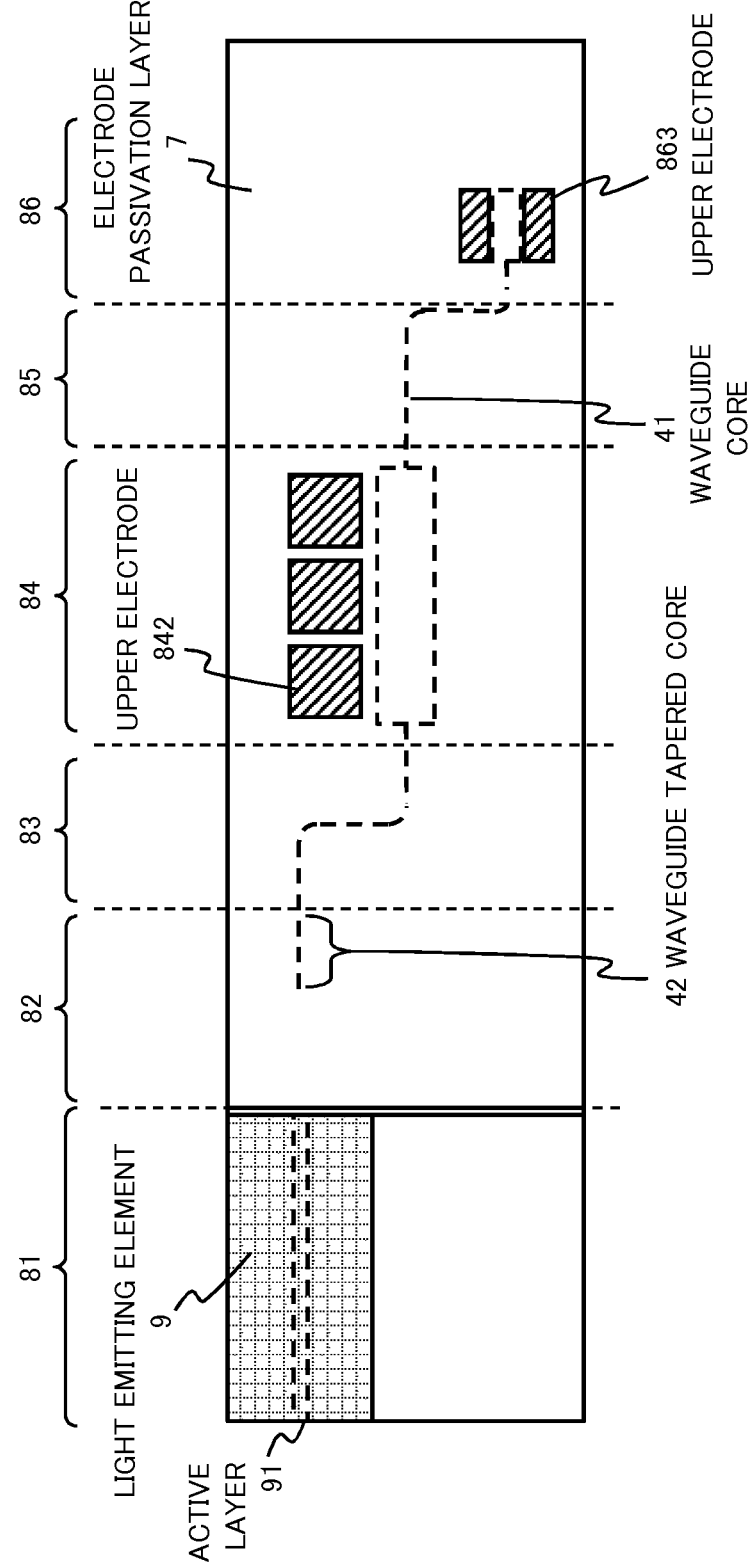
FIG. 2C is a top view illustrating the structure of the optical integrated circuit of the second exemplary embodiment of the present invention.

FIG. 2A is a cross-sectional view illustrating a structure of an optical integrated circuit 1a of a second exemplary embodiment of the present invention. FIG. 2B is a plan view illustrating the structure along a cross section including the line X-X' (at a height of a half of the thickness of the core layer 4) of the optical integrated circuit 1a. FIG. 2C is a top view illustrating a structure of the optical integrated circuit 1a.

On a substrate 2 of the optical integrated circuit 1a of the second exemplary embodiment, a lower clad layer 3, a core layer 4, a shared layer 5, an upper clad layer 6, and an electrode passivation layer 7 are layered sequentially. The optical integrated circuit 1a includes various element sections such as a light emitting element mounting section 81 on which a light emitting element 9, which is a light source, is mounted, a spot size converter section 82, a waveguide section 83, a modulator section 84, a waveguide section 85, and an photodetector section 86 on the substrate 2. The waveguide sections 83 and 85 connect the spot size converter section 82, the modulator section 84, and a photodetector section 86 by a waveguide core 41 (core layer 4). On the side of the waveguide section 83 toward the light emitting element 9, the optical integrated circuit 1a has the spot size converter section 82 including a waveguide tapered core 42.

In the light emitting element mounting section 81, the light emitting element 9 is mounted on a pedestal 811 by adjusting the height of the upper surface of the pedestal 811. A lower electrode 813 and a light emitting element electrode 92 are fused together by solder 812. The light emitting element 9 is an LD element of an edge emitting type which emits light forward from the front end face of an active layer 91. The active layer 91 is arranged at a position where optical coupling efficiency with a waveguide core 51, formed with the shared layer 5, takes a maximum value. In other words, the active layer 91 is arranged so that the optical axis of the active layer 91 aligns with the optical axis of the waveguide core 51.

The active layer 91 may be structured in a quantum well structure or a quantum dot structure. For a material for the active layer 91, AlGaInP, InGaAsP, or the like may be chosen appropriately in accordance with an operating wavelength. The light emitting element 9, to increase alignment tolerance in the optical coupling, may have a structure in which a spot size converter is incorporated on the light emitting side thereof (not illustrated in FIG. 2A).

The spot size converter section 82 is connected to the waveguide section 83 and, to increase alignment tolerance in the optical coupling with the light emitting element 9, also has the waveguide core 51 on the waveguide tapered core 42. The waveguide tapered core 42 is a tapered core of which the width or the thickness monotonically increases or decreases along the propagation direction of light. FIG. 2B shows the tapered core 42 of which the width decreases in the direction of the incident face side of light. The waveguide core 51 is formed by depositing the shared layer 5, etching both sides of the shared layer 5, and then depositing the upper clad layer 6 and the electrode passivation layer 7. In consequence, a light confinement structure in the horizontal direction on top of the vertical direction is achieved, causing spot size conversion from the waveguide core 51 to the waveguide core 41 through the waveguide tapered core 42 to be carried out.

The waveguide section 83 is configured with a waveguide which connects the spot size converter section 82 to the modulator section 84. The waveguide section 83 uses the waveguide core 41 as a core. Three layers, the shared layer 5, the upper clad layer 6, and the electrode passivation layer 7, function as an upper clad layer as a whole.

The modulator section 84 connects the waveguide section 83 to the waveguide section 85 and, modulates an input light from the waveguide section 83 by inputting an electrical signal through upper electrodes 841 and 842 from the outside. In the modulator section 84, the shared layer 5 and the upper clad layer 6 function as an interlayer insulating film. The upper electrode 841 and the upper electrode 842 constitute a first layer electrical wiring and a second layer electrical wiring, respectively.

In FIG. 2B, a Mach-Zehnder type modulator is illustrated. It is possible to apply a method in which, by doping the Si waveguide core or the vicinity thereof by ion implantation and changing a refractive index by carrier modulation, the light path length and the phase of one arm are shifted and a light transmission rate is varied. It is also possible to apply a method in which the modulator operates in a push-pull method in which voltage are individually applied to both arms. A structure such as a ring modulator may also be used.

The waveguide section 85 is configured with a waveguide which connects the modulator section 84 to the photodetector section 86. The waveguide section 85 uses the waveguide core 41 as a core. Three layers, the shared layer 5, the upper clad layer 6, and the electrode passivation layer 7, function as an upper clad layer as a whole.

The photodetector section 86 is connected to the waveguide section 85, has an absorption layer 861 made of Ge or the like on the core layer 4, and outputs a current to the outside from an upper electrode 863 via an upper electrode 862. The shared layer 5 and the upper clad layer 6 function as an interlayer insulating film. The upper electrode 862 and the upper electrode 863 constitute a first layer electrical wiring and a second layer electrical wiring, respectively.

For the substrate 2, the lower clad layer 3, and the core layer 4, an SOI (Silicon on Insulator) substrate may be used. In other words, an Si substrate, a BOX layer (Buried Oxide Layer, $SiO_2$), and an SOI layer (Si) of an SOI substrate may be used for the substrate 2, the lower clad layer 3, and the core layer 4, respectively.

The shared layer 5 is formed continuously across the spot size converter section 82, the waveguide section 83, the modulator section 84, the waveguide section 85, and the photodetector section 86 on the waveguide core 41, which is formed on the lower clad layer 3, which is formed on the substrate 2. Consequently, the shared layer 5 functions as a core layer for the spot size converter 82, as an upper clad layer for the waveguide sections 83 and 85, and as an interlayer insulating film for the modulator section 84 and the photodetector section 86, respectively.

In order to achieve these functions, the refractive index n of the shared layer 5 is set at a value greater than the refractive indices $n_{clad}$ of the lower clad layer 3 and the upper clad layer 6 and less than the refractive index $n_{core}$ of the core layer 4. That is, the refractive indices have a relation expressed by the equation 1.

$$n_{clad} < n < n_{core} \quad \text{(Equation 1)}$$

As an example, when the core layer 4 is formed as an SOI layer, the lower clad layer 3 is formed as a BOX layer, and the upper clad layer 6 and the electrode passivation layer 7 are formed by $SiO_2$, the shared layer 5 may be formed by $SiO_X$ (n=1.535, with a refractive index difference from $SiO_2$ of 5%) and have a film thickness of 1 μm. With such a configuration, in the spot size converter section 82, forming the waveguide core 51 (for example, with a width of 3 μm) by processing the shared layer 5 on both sides of the waveguide tapered core 42 makes it possible to configure a double core structure in which the spot size conversion from the waveguide core 51 to the waveguide tapered core 42 is carried out.

In the spot size converter section 82, the position of the leading end portion of the waveguide tapered core 42 is determined as the following. Specifically, the position may be adjusted so that light from the light emitting element 9 is propagated to the waveguide core 51 and further propagated to the waveguide tapered core 42 while maintaining stable distribution without diffusion. For example, the distance from the incident end face (the left end face of the waveguide core 51 in FIG. 2B) of the waveguide core 51 to the leading end portion of the waveguide tapered core 42 may be set at a value of about 100 μm. Because influence from variation in the leading end width of the waveguide tapered core 42 can be neglected when the distance is set at such an amount, it is possible to relax manufacturing precision of the leading end width (about 100 nm).

The position of the terminal end portion of the taper of the waveguide tapered core 42 may be set at the terminal end portion (the right termination of the waveguide core 51 in FIG. 2B) of the waveguide 51. As long as light diffusion does not have an influence, the position of the terminal end portion of the taper may be moved to the right or left (on the drawing of FIG. 2B) of the terminal end portion of the waveguide core 51. The taper length can be about 200 μm, for example.

It is possible to adjust the thickness of the shared layer by adjusting the width of the waveguide core 51 and the refractive index of the shared layer 5. Therefore, it becomes possible to manufacture an integrated circuit on which a level difference is suppressed in the spot size converter section 82. This configuration also makes it easy to carry out a planarization process such as chemical mechanical polishing (CMP) at a later process.

For the shared layer 5, SiON, $HfO_2$, or the like, the refractive index of which is higher than $SiO_2$, may be used in substitution for $SiO_X$.

The upper clad layer 6 is made of $SiO_2$ or the like and deposited after the upper electrodes 841 and 862 are formed with Al or the like in the modulator section 84 and the photodetector section 86.

The electrode passivation layer 7 is made of $SiO_2$ or the like and deposited after the upper electrodes 842 and 863 are formed with Al or the like in the modulator section 84 and the photodetector section 86. On the electrode passivation layer 7, an opening is formed above each electrode. Through the opening, it is possible to electrically connect a modulator driver and a transimpedance amplifier or a limiting amplifier to the modulator section 84 and the photodetector section 86, respectively (not illustrated in FIG. 2A).

Next, an operation of the optical integrated circuit 1a will be described.

The light emitting element 9 emits light when a current is input from the lower electrode 813 in the light emitting element mounting section 81 to the active layer 91 via the light emitting element electrode 92. The emitted light is propagated to the waveguide core 51 in the spot size converter section 82 through optical coupling. Further, the spot size of the light is converted and the light is propagated to the waveguide core 41 via the waveguide tapered core 42. Next, the light is input to the modulator section 84 via the waveguide section 83 which includes the waveguide core 41. The input light is optically modulated on the modulator section 84 via the upper electrode 841 when an electrical signal is input to the upper electrode 842. The modulated light is input to the photodetector section 86 via the waveguide section 85. In the photodetector section 86, the light is converted to an electrical signal on the absorption layer 861, and the electrical signal is output to the outside from the upper electrode 863 via the upper electrode 862.

As described above, on the optical integrated circuit 1a of the second exemplary embodiment, the shared layer 5 functions as a core layer for the spot size converter 82, as an upper clad layer for the waveguide sections 83 and 85, as an interlayer insulating film for the modulator section 84 and the photodetector section 86, respectively. In consequence, it is not necessary to remove the shared layer 5 in a manufacturing process of the modulator section 84 and the photodetector section 86. Accordingly, a passivation film, an etch stop layer, or the like in the removal of the shared layer 5 is not necessary, which leads to a simplification in the manufacturing process.

In forming each element section such as the modulator section 84 and the photodetector section 86, it is possible to apply a structure and a manufacturing process which are disclosed in NPL 1 or the like and can be practiced by a person engaged in the field. In forming a contact hole which connects electrodes in the layer thickness direction, in order to suppress notches in dry etching, an insulating layer, to which wet etching is easily applied, may be inserted as a lower layer. In order to prevent a leakage current, a passivation layer may be formed on the absorption layer 861.

Although a configuration in which the optical integrated circuit 1a of the second exemplary embodiment includes a single light emitting element was described, the configuration is not limited to this configuration and a configuration in which a plurality of light emitting elements (LD array) are arranged may also be applied. For example, as with NPL 2, an LD array mounting structure in which alignment marks are arranged on both sides of an LD array and flip-chip mounting similar to the case of a single LD is carried out may be used.

It is also possible to disconnect the photodetector section 86 at the waveguide 85 in the optical integrated circuit 1a of the second exemplary embodiment and form a spot size converter similar to the spot size converter section 82 around the output end face of the waveguide section 85 to connect an optical fiber.

According to the second exemplary embodiment, as with the first exemplary embodiment, it is possible to provide an optoelectric integrated circuit by which both a simplification of a manufacturing process and a high efficiency in optical coupling between a light source and a waveguide are achieved at the same time.

Third Exemplary Embodiment

Figure 3A:
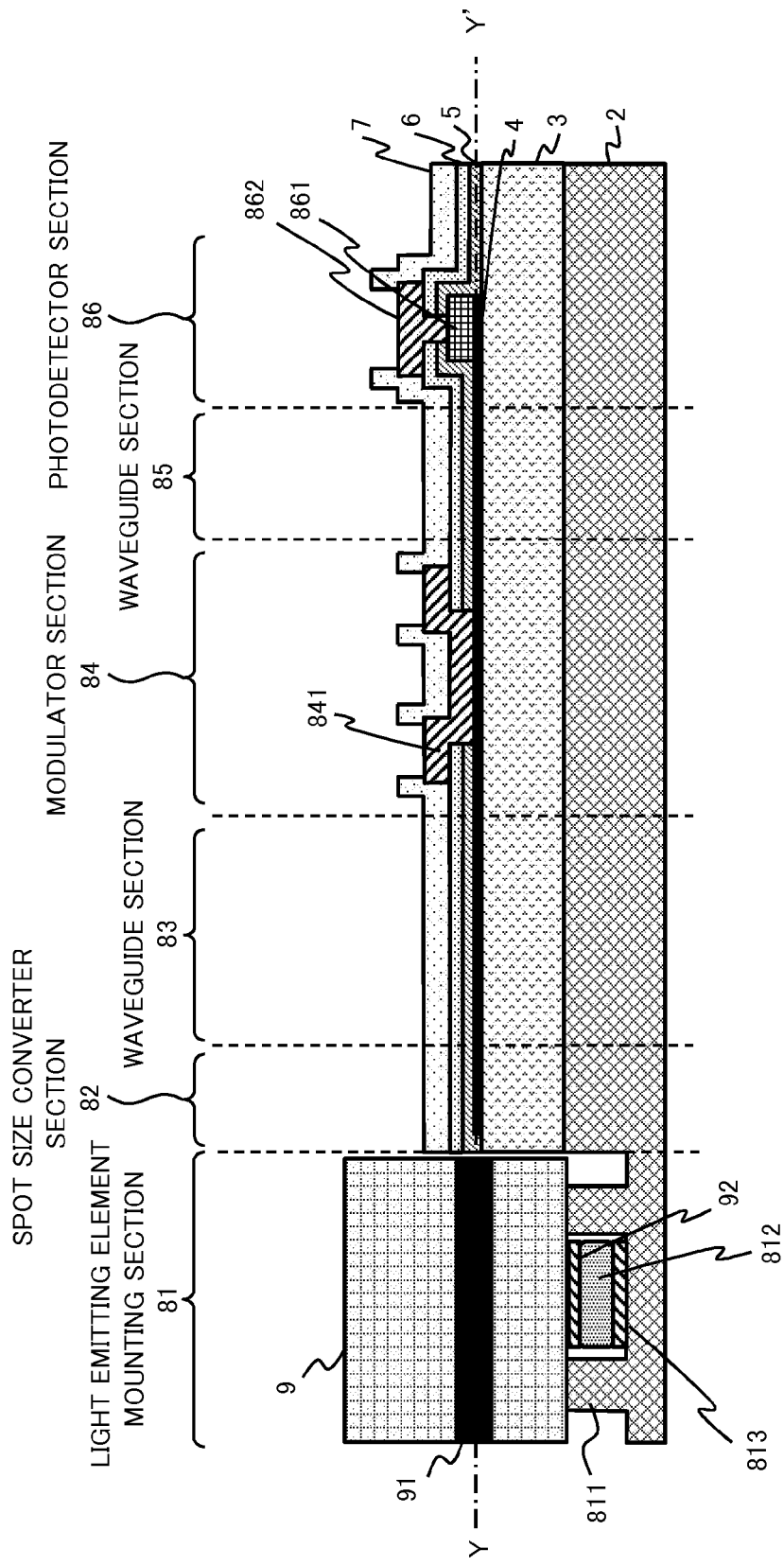
FIG. 3A is a cross-sectional view illustrating a structure of an optical integrated circuit of a third exemplary embodiment of the present invention.
Figure 3B:
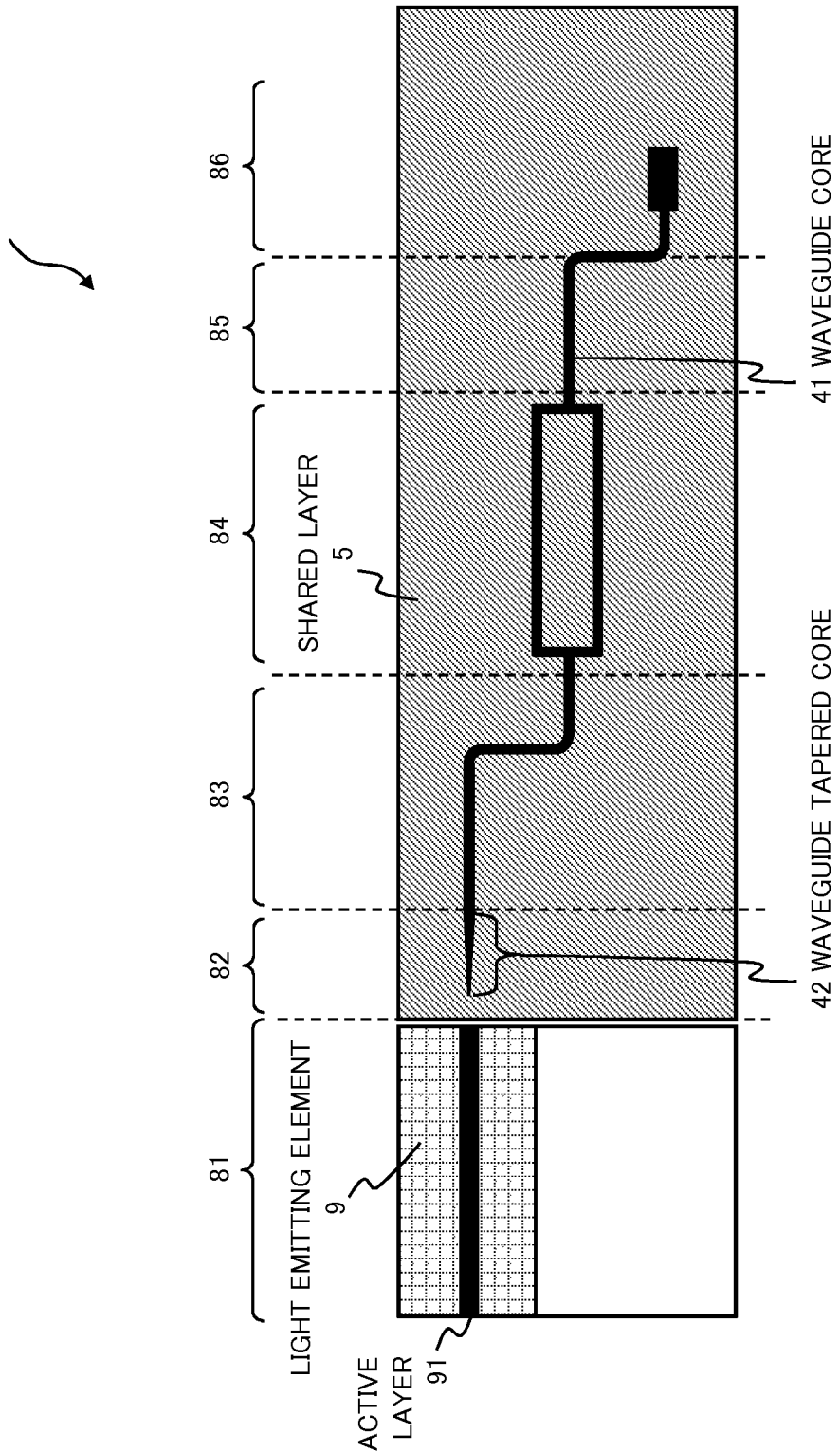
FIG. 3B is a plan view illustrating the structure along a cross section including the line Y-Y' of the optical integrated circuit of the third exemplary embodiment of the present invention.
Figure 3C:
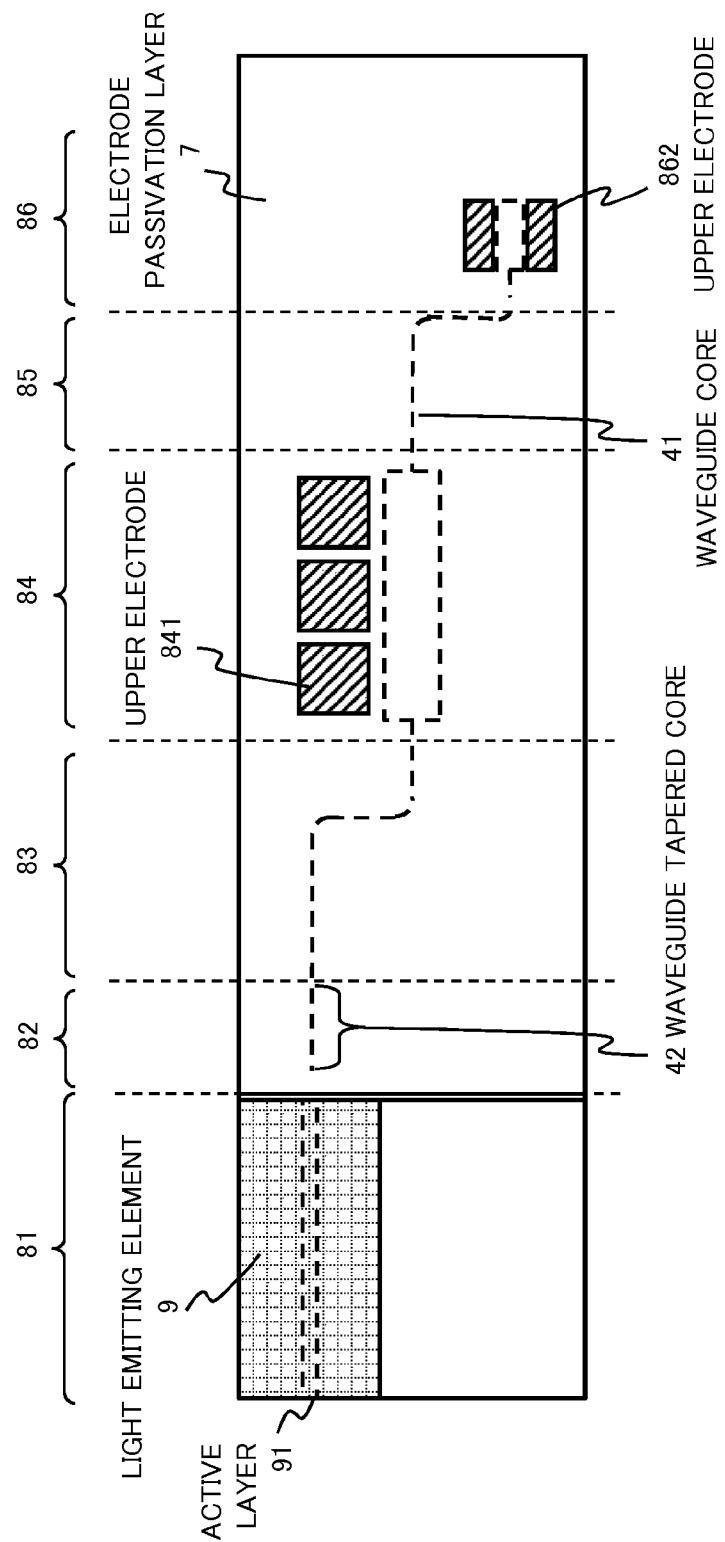
FIG. 3C is a top view illustrating the structure of the optical integrated circuit of the third exemplary embodiment of the present invention.

FIG. 3A is a cross-sectional view illustrating a structure of an optical integrated circuit 1b of a third exemplary embodiment of the present invention. FIG. 3B is a plan view illustrating the structure along a cross section including the line Y-Y' (at a height of a half of the thickness of a core layer 4) of the optical integrated circuit 1b. FIG. 3C is a top view illustrating the structure of the optical integrated circuit 1b.

The optical integrated circuit 1b of the third exemplary embodiment differs from the optical integrated circuit 1a of the second exemplary embodiment in that a spot size converter section 82 of the optical integrated circuit 1b has a slab layer structure which includes a core configured with a shared layer 5. Therefore, an etching process to form the waveguide core 51 of the second exemplary embodiment is unnecessary. Because, by retaining the distance (referred to as a window length) of a sharpened end section of a waveguide tapered core 42 from an incident end face (the left end face of the spot size converter section 82 in FIG. 3B), influence from a selection ratio in a simultaneous etching of different materials can be suppressed, it is easy to optimize end face processing and it is possible to suppress an increase in coupling loss. On the other hand, because the longer the window length is, the greater the internal optical loss becomes, the window length can be more than zero and about 3 μm or less as a length for which an increase in the coupling loss can be sufficiently suppressed.

The optical integrated circuit 1b further differs from the optical integrated circuit 1a in that the optical axis of an active layer 91 of a light emitting element 9 aligns with the optical axis of the waveguide tapered core 42. Furthermore, the optical integrated circuit 1b differs from the optical integrated circuit 1a in that the shared layer 5 functions as an interlayer insulating film in combination with an upper clad layer 6 in each element section of a modulator section 84 and an photodetector section 86, and thus the number of electrical wiring layers of the modulator section 84 and the photodetector section 86 is one. Description of common portions to the second exemplary embodiment will be omitted.

As an example of the third exemplary embodiment, when a lower clad layer 3, the core layer 4, and the upper clad layer 6 and an electrode passivation layer 7 are formed as a BOX layer ($SiO_2$), an SOI layer (Si), and $SiO_2$ of an SOI substrate, respectively, the shared layer 5 may be formed with $SiO_X$ (n=1.52, with a refractive index difference from $SiO_2$ of 3%) and have a film thickness of 0.5 μm. With this configuration, it is possible to widen the spot size in the vertical direction in FIG. 3B through a slab layer structure to relax the coupling tolerance. Because the thickness of the shared layer 5 can be controlled by adjusting the refractive index, the shared layer 5 can be adjusted without level differences. Moreover, no processing after film-deposition is necessary for the shared layer 5, making it possible to simplify the manufacturing process.

According to the third exemplary embodiment, as with the second exemplary embodiment, it is possible to provide an optoelectric integrated circuit by which both a simplification of a manufacturing process and a high efficiency in optical coupling between a light source and a waveguide are achieved at the same time.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

A portion or all of the above-described exemplary embodiments may be described as the following supplementary notes but will not be limited to the followings.

Supplementary Notes (Supplementary Note 1)

An optical integrated circuit formed on a substrate, including:

a light source;

a spot size converter section configured to convert a spot size of light emitted from the light source;

a waveguide section connected to the spot size converter section; and an active section connected to the waveguide section, wherein, on the substrate, a lower clad layer, a core layer, a shared layer, and an upper clad layer are sequentially layered, a refractive index of the shared layer is greater than refractive indices of the lower clad layer and the upper clad layer and less than a refractive index of the core layer, and the spot size converter section, the waveguide section, and the active section share the shared layer.

(Supplementary Note 2)

The optical integrated circuit according to supplementary note 1, wherein the shared layer is a core of the spot size converter section, an upper clad of the waveguide section, and an interlayer insulating layer of the active section, respectively.

(Supplementary Note 3)

An optical integrated circuit formed on a substrate, including:

a light source;

a spot size converter section configured to convert a spot size of light emitted from the light source;

a waveguide section connected to the spot size converter section; and an active section connected to the waveguide section, the optical integrated circuit further including a shared layer on the substrate, wherein the shared layer functions as a core for the spot size converter section, as an upper clad for the waveguide section, and as an interlayer insulating layer for the active section, respectively.

(Supplementary Note 4)

The optical integrated circuit according to any one of supplementary notes 1 to 3, wherein the shared layer is continuously formed across the spot size converter section, the waveguide section, and the active section.

(Supplementary Note 5)

The optical integrated circuit according to any one of supplementary notes 1 to 4, wherein the light source is a light emitting element.

(Supplementary Note 6)

The optical integrated circuit according to supplementary note 5, wherein the light emitting element is mounted on pedestals by adjusting the height of the upper surface of the pedestal in a light element mounting section.

(Supplementary Note 7)

The optical integrated circuit according to any one of supplementary note 5 or 6, where in the light emitting element is semiconductor laser.

(Supplementary Note 8)

The optical integrated circuit according to supplementary note 7, wherein an optical axis of an active layer included in the semiconductor laser aligns with an optical axis of a core of the shared layer included in the spot size converter section.

(Supplementary Note 9)

The optical integrated circuit according to supplementary note 1 or 2, wherein the spot size converter section includes a tapered core of which the width or the thickness monotonically increases or decreases along a light propagation direction, the tapered core being configured with the core layer.

(Supplementary Note 10)

The optical integrated circuit according to supplementary note 9, wherein the spot size converter section includes a core, which is configured with the shared layer, on the tapered core.

(Supplementary Note 11)

The optical integrated circuit according to supplementary note 9, wherein the spot size converter section includes a slab layer, which is configured with the shared layer, on the tapered core.

(Supplementary Note 12)

The optical integrated circuit according to any one of supplementary notes 1 to 11, wherein the active section is a modulator or a photodetector.

(Supplementary Note 13)

The optical integrated circuit according to any one of supplementary notes 1 to 12, wherein another spot size converter is formed around the output end face of the waveguide section to connect an optical fiber.

(Supplementary Note 14)

The optical integrated circuit according to any one of supplementary notes 1 to 13, wherein the substrate includes Si.

(Supplementary Note 15)

The optical integrated circuit according to either of supplementary notes 1 and 2, wherein the shared layer includes at least a material chosen from $SiO_X$, SiON, and $HfO_2$, which have a higher refractive index than $SiO_2$, the lower clad layer and the upper clad layer include $SiO_2$, and the core layer includes Si.

(Supplementary Note 16)

A manufacturing method of an optical integrated circuit which includes a light source, a spot size converter section configured to convert a spot size of light emitted from the light source, a waveguide section connected to the spot size converter section, and an active section connected to the waveguide section on a substrate, including:

layering sequentially a lower clad layer, a core layer, a shared layer, and an upper clad layer on the substrate;

making a refractive index of the shared layer greater than refractive indices of the lower clad layer and the upper clad layer and less than a refractive index of the core layer; and forming the shared layer in the spot size converter section, the waveguide section, and the active section.

(Supplementary Note 17)

The manufacturing method of an optical integrated circuit according to supplementary note 16, wherein the shared layer is a core of the spot size converter section, an upper clad of the waveguide section, and an interlayer insulating layer of the active section.

(Supplementary Note 18)

The manufacturing method of an optical integrated circuit according to supplementary note 16 or 17, wherein the shared layer is continuously formed across the spot size converter section, the waveguide section, and the active section.

(Supplementary Note 19)

The manufacturing method of an optical integrated circuit according to any one of supplementary notes 16 to 18, wherein the light source is a light emitting element.

(Supplementary Note 20)

The manufacturing method of an optical integrated circuit according to any one of supplementary note 16 to 19, wherein the light emitting element is mounted on pedestals by adjusting the height of the upper surface of the pedestal in a light element mounting section.

(Supplementary Note 21)

The optical integrated circuit according to any one of supplementary note 19 or 20, where in the light emitting element is semiconductor laser.

(Supplementary Note 22)

The manufacturing method of an optical integrated circuit according to supplementary note 21, wherein an optical axis of an active layer included in the semiconductor laser is caused to align with an optical axis of a core of the shared layer included in the spot size converter section.

(Supplementary Note 23)

The manufacturing method of an optical integrated circuit according to any one of supplementary notes 16 to 22, wherein a tapered core of which the width or the thickness monotonically increases or decreases along a light propagation direction is formed in the spot size converter section, the tapered core being configured with the core layer.

(Supplementary Note 24)

The manufacturing method of an optical integrated circuit according to supplementary note 23, wherein a core configured with the shared layer is formed on the tapered core in the spot size converter section.

(Supplementary Note 25)

The manufacturing method of an optical integrated circuit according to supplementary note 23, wherein a slab layer configured with the shared layer is formed on the tapered core in the spot size converter section.

(Supplementary Note 26)

The manufacturing method of an optical integrated circuit according to any one of supplementary notes 16 to 25, wherein the active section is a modulator or a photodetector.

(Supplementary Note 27)

The optical integrated circuit according to any one of supplementary notes 16 to 26, wherein another spot size converter is formed around the output end face of the waveguide section to connect an optical fiber.

(Supplementary Note 28)

The manufacturing method of an optical integrated circuit according to any one of supplementary notes 16 to 27, wherein the substrate is made of Si.

(Supplementary Note 29)

The manufacturing method of an optical integrated circuit according to any one of supplementary note 16 to 28, wherein the shared layer is made of at least a material chosen from $SiO_x$, SiON, and $HfO_2$, which have a higher refractive index than $SiO_2$, the lower clad layer and the upper clad layer are made of $SiO_2$, and the core layer is made of Si.

1, 1a, 1b Optical integrated circuit
11 Light source
12 Spot size converter section
13 Waveguide section
14 Active section
2 Substrate
3 Lower clad layer
4 Core layer
41 Waveguide core
42 Waveguide tapered core
5 Shared layer
51 Waveguide core
6 Upper clad layer
7 Electrode passivation layer
81 Light emitting element mounting section
811 Pedestal
812 Solder
813 Lower electrode
82 Spot size converter section
83, 85 Waveguide section
84 Modulator section
841, 842 Upper electrode
86 Photodetector section
861 Absorption layer
862, 863 Upper electrode
9 Light emitting element
91 Active layer
92 Light emitting element electrode

The invention claimed is:

1. An optical integrated circuit formed on a substrate, comprising:
   a light source;
   a spot size converter section configured to convert a spot size of light emitted from the light source;
   a waveguide section connected to the spot size converter section; and
   an active section connected to the waveguide section,
   wherein, on the substrate, a lower clad layer, a core layer, a shared layer, and an upper clad layer are sequentially layered,
   a refractive index of the shared layer is greater than refractive indices of the lower clad layer and the upper clad layer and less than a refractive index of the core layer, and
   the spot size converter section, the waveguide section, and the active section share the shared layer.

2. The optical integrated circuit according to claim 1,
   wherein the shared layer is a core of the spot size converter section, an upper clad of the waveguide section, and an interlayer insulating layer of the active section, respectively.

3. The optical integrated circuit according to claim 1,
   wherein the shared layer is continuously formed across the spot size converter section, the waveguide section, and the active section.

4. The optical integrated circuit according to claim 1,
   wherein the light source is a light emitting element.

5. The optical integrated circuit according to claim 4,
   wherein the light emitting element is mounted on pedestals by adjusting a height of upper surface of the pedestals in a light element mounting section.

6. The optical integrated circuit according to claim 4,
   where in the light emitting element is semiconductor laser.

7. The optical integrated circuit according to claim 6,
   wherein an optical axis of an active layer included in the semiconductor laser aligns with an optical axis of a core of the shared layer included in the spot size converter section.

8. The optical integrated circuit according to claim 1,
   wherein the spot size converter section includes a tapered core of which the width or the thickness monotonically increases or decreases along a light propagation direction, the tapered core being configured with the core layer.

9. The optical integrated circuit according to claim 8,
   wherein the spot size converter section includes, on the tapered core, a core configured with the shared layer or a slab layer configured with the shared layer.

10. The optical integrated circuit according to claim 1, wherein the active section is a modulator or a photodetector.

11. The optical integrated circuit according to claim 1, wherein another spot size converter is formed around the output end face of the waveguide section to connect an optical fiber.

12. The optical integrated circuit according to claim 1, wherein the shared layer includes at least a material chosen from $SiO_X$, SiON, and $HfO_2$, which have a higher refractive index than $SiO_2$, the lower clad layer and the upper clad layer include $SiO_2$, and the core layer includes Si.

13. An optical integrated circuit formed on a substrate, comprising:
a light source;
a spot size converter section configured to convert a spot size of light emitted from the light source;
a waveguide section connected to the spot size converter section; and
an active section connected to the waveguide section,
the optical integrated circuit further comprising a shared layer on the substrate,
wherein the shared layer functions as a core for the spot size converter section, as an upper clad for the waveguide section, and as an interlayer insulating layer for the active section, respectively.

\* \* \* \* \*